(12) United States Patent
Loebig et al.

(10) Patent No.: US 9,551,299 B2
(45) Date of Patent: Jan. 24, 2017

(54) CHECK VALVE FOR PROPULSIVE ENGINE COMBUSTION CHAMBER

(71) Applicants: Rolls-Royce North American Technologies, Inc., Indianapolis, IN (US); Rolls-Royce Corporation, Indianapolis, IN (US)

(72) Inventors: James C. Loebig, Greenwood, IN (US); Christopher D. DeBruhl, Carmel, IN (US); John D. Holdcraft, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 271 days.

(21) Appl. No.: 14/202,397

(22) Filed: Mar. 10, 2014

(65) Prior Publication Data

US 2014/0260256 A1    Sep. 18, 2014

Related U.S. Application Data

(60) Provisional application No. 61/780,617, filed on Mar. 13, 2013.

(51) Int. Cl.
| | |
|---|---|
| *F02K 7/02* | (2006.01) |
| *F23R 3/04* | (2006.01) |
| *F23R 3/06* | (2006.01) |

(52) U.S. Cl.
CPC . *F02K 7/02* (2013.01); *F23R 3/04* (2013.01); *F23R 3/06* (2013.01);
(Continued)

(58) Field of Classification Search
CPC ......................................................... F02K 7/02
See application file for complete search history.

(56) References Cited

U.S. PATENT DOCUMENTS

| | | | |
|---|---|---|---|
| 2,727,535 A | 12/1955 | Linderoth | |
| 3,864,199 A * | 2/1975 | Meginnis | ................ F01D 5/184 |
| | | | 416/229 A |

(Continued)

FOREIGN PATENT DOCUMENTS

| | | |
|---|---|---|
| EP | 2551593 A2 | 1/2013 |
| FR | 2318313 A1 | 2/1977 |

(Continued)

OTHER PUBLICATIONS

International Search Report and Written Opinion for International Application No. PCT/US2014/022408, Jul. 15, 2014, 13 pages.

*Primary Examiner* — Jacob Cigna
(74) *Attorney, Agent, or Firm* — Barnes & Thornburg LLP

(57) ABSTRACT

A combustion chamber includes an inner wall, an outer wall surrounding the inner wall, and a flow passage between the inner wall and outer wall that permits forward flow and restricts reverse flow. The inner wall has a plurality of effusion holes in fluid communication with the inside of the combustion chamber. The outer wall has a plurality of cooling side holes in fluid communication with a cooling source. The inner wall and the outer wall define a flow passage therebetween that fluidly connects one or more of the cooling side holes with one or more of the effusion holes. The flow passage has a geometric configuration to permit forward flow of gases through the flow passage from the cooling source to the inside of the combustion chamber and to restrict reverse flow of gases through the flow passage from the inside of the combustion chamber to the cooling source. The permitted flow rate is greater than the restricted flow rate.

18 Claims, 4 Drawing Sheets

US 9,551,299 B2
Page 2

(52) U.S. Cl.
CPC ......... *F23R 2900/03041* (2013.01); *F23R 2900/03042* (2013.01); *F23R 2900/03341* (2013.01); *F23R 2900/03342* (2013.01); *Y10T 29/49229* (2015.01)

(56) References Cited

U.S. PATENT DOCUMENTS

| | | | | |
|---|---|---|---|---|
| 4,105,364 A * | 8/1978 | Dodd | ............... | F01D 5/189 415/115 |
| 4,168,348 A * | 9/1979 | Bhangu | ............... | F23M 5/085 416/90 R |
| 4,302,940 A * | 12/1981 | Meginnis | ............... | F23R 3/002 416/231 A |
| 4,315,406 A * | 2/1982 | Bhangu | ............... | F23R 3/002 428/137 |
| 4,695,247 A * | 9/1987 | Enzaki | ............... | F23R 3/002 431/351 |
| 4,926,633 A | 5/1990 | Nash et al. | | |
| 5,239,823 A * | 8/1993 | Sims | ............... | F02K 1/822 239/265.17 |
| 5,513,489 A | 5/1996 | Bussing et al. | | |
| 7,278,256 B2 | 10/2007 | Norris et al. | | |
| 7,464,554 B2 * | 12/2008 | Cheung | ............... | F23R 3/00 60/754 |
| 7,526,912 B2 | 5/2009 | Tangirala et al. | | |
| 7,748,211 B2 | 7/2010 | Norris et al. | | |
| 8,177,492 B2 * | 5/2012 | Knapp | ............... | F01D 5/18 415/173.1 |
| 2006/0260291 A1 | 11/2006 | Vandervort et al. | | |
| 2007/0180810 A1 | 8/2007 | Chapin et al. | | |
| 2007/0180811 A1 | 8/2007 | Rasheed et al. | | |
| 2008/0115480 A1 | 5/2008 | Rasheed et al. | | |
| 2008/0141954 A1 * | 6/2008 | Norris | ............... | F01D 25/12 123/41.21 |

FOREIGN PATENT DOCUMENTS

| GB | 1550368 A | 8/1979 |
|---|---|---|
| WO | 2011020485 A1 | 2/2011 |

* cited by examiner

CHECK VALVE FOR PROPULSIVE ENGINE COMBUSTION CHAMBER

CROSS REFERENCE TO RELATED APPLICATIONS

This application claims priority to and the benefit of U.S. Provisional Patent Application No. 61/780,617, filed 13 Mar. 2013, the disclosure of which is now expressly incorporated herein by reference.

STATEMENT REGARDING FEDERALLY SPONSORED RESEARCH OR DEVELOPMENT

The present application was made with United States government support under Contract No. N7B813. The United States government may have certain rights in the present application.

TECHNICAL FIELD

The present disclosure relates to propulsive engine combustion chambers. More particularly, but not exclusively, the present disclosure relates to check valves having various geometric features for such combustion chambers.

BACKGROUND

Providing cooling to the walls of combustion chambers for propulsive engines such as pulse detonation engines and wave rotor engines remains an area of interest. Some existing systems have various shortcomings, drawbacks, and disadvantages relative to certain applications. Accordingly, there remains a need for further contributions in this area of technology.

SUMMARY

One embodiment of the present application is a combustion chamber including inner and outer walls between which is provided a flow passage that permits forward flow and restricts reverse flow. Other embodiments include unique methods, systems, devices, and apparatus to provide for a combustion chamber having a dual wall cooling configuration with integral internal flow passages. Further embodiments, forms, objects, aspects, benefits, features, and advantages of the present application shall become apparent from the description and figures provided herewith.

BRIEF DESCRIPTION OF THE FIGURES

Features of the application will be better understood from the following detailed description when considered in reference to the accompanying drawings, in which.

DETAILED DESCRIPTION OF THE DRAWINGS

Figure 1:
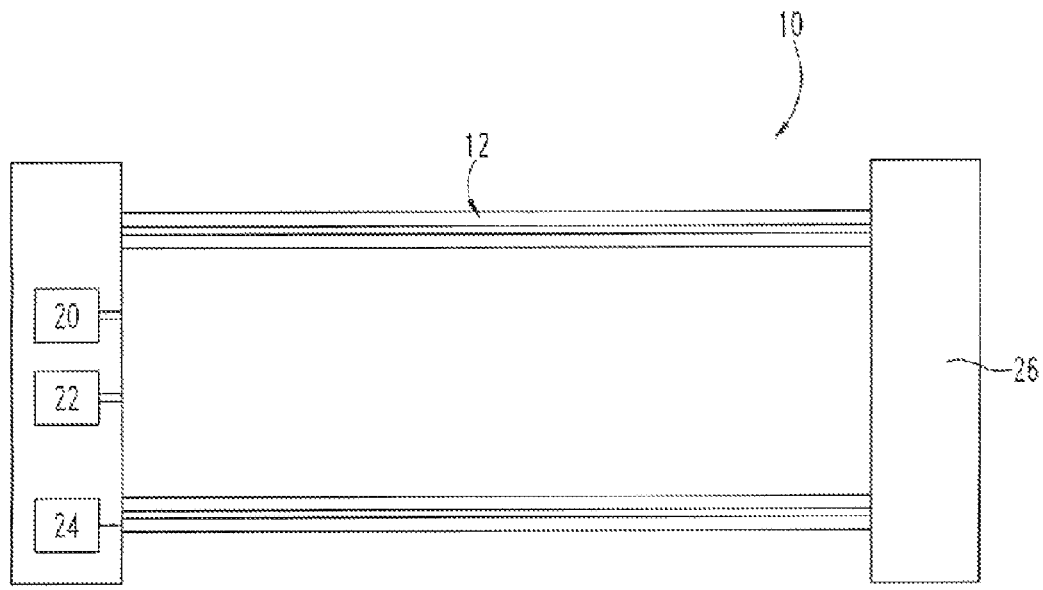
FIG. 1 shows a pulse detonation engine including a propulsive engine combustion chamber according to an embodiment.

While the present disclosure can take many different forms, for the purpose of promoting an understanding of the principles of the disclosure, reference will now be made to the embodiments illustrated in the drawing and specific language will be used to describe the same. It will nevertheless be understood that no limitation of the scope of the disclosure is thereby intended. Any alterations and further modifications of the described embodiments, and any further applications of the principles of the disclosure as described herein, are contemplated as would normally occur to one skilled in the art to which the disclosure relates.

Figure 2:
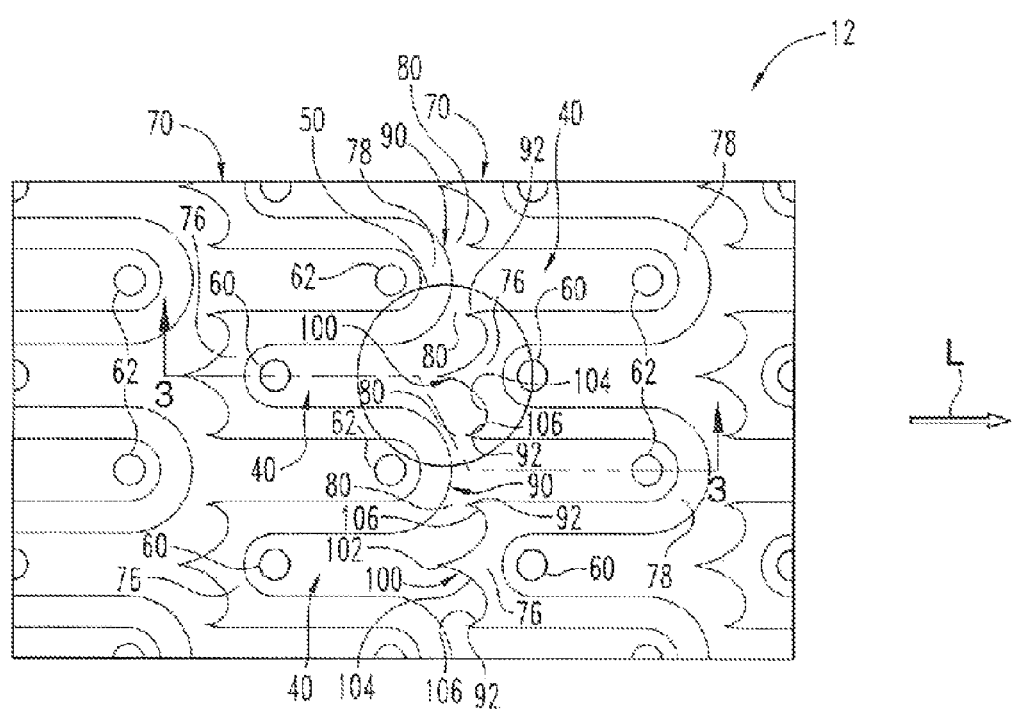
FIG. 2 is a radial direction view of a section of the walls of the FIG. 1 combustion chamber according to an embodiment, where with respect to such view only holes 60 should be shown in solid lines and others in dash lines, but for purposes of legibility all lines are shown as solid.
Figure 3:
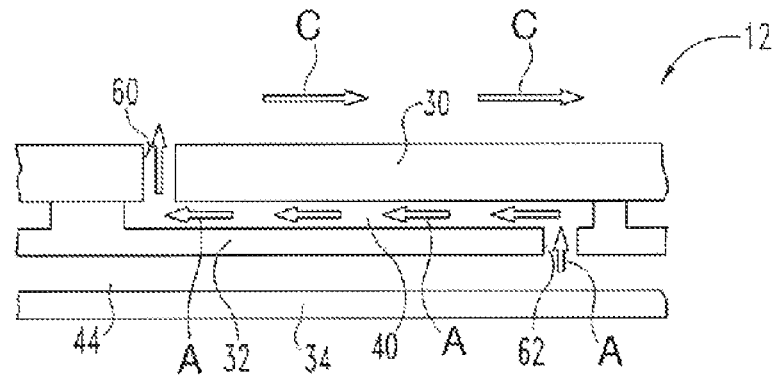
FIG. 3 is a cross sectional view taken along the line 3-3 in FIG. 2 of the combustion chamber according to an embodiment.

Referring to FIGS. 1 through 3, there is illustrated one form of a pulse detonation engine (PDE) 10 incorporating a propulsive engine combustion chamber 12 according to an embodiment. Although the combustion chamber 12 is described herein in the context of a pulse detonation engine (PDE) 10, it will be appreciated that the present application is not limited to pulse detonation engines 10 and other types of propulsive engines and combustion chambers are contemplated herein. Thus, the propulsive engine 10 can comprise other types of non-steady flow type engines, such as a wave rotor engine, or any other type of propulsive engine. Further, the present application is not limited to the propulsive engine 10 having the characteristics shown in FIG. 1, and it will be appreciated that other propulsive engines having different characteristics are contemplated herein. The combustion chamber 12 can take the form of a wave rotor, a pulse combustor, a shock tube, or the like. Further, the combustion chamber 12 can be used in a variety of other applications, for example, microchannel chemical reactor units, such as used for steam methane reforming, Fischer-Tropsch reactors, and long chain hydrocarbon refining units.

The illustrative PDE 10 includes a fuel supply 20, an oxidizer supply 22, a cooling air supply 24, and an exit valve 26. The cooling air supply 24 is shown disposed at the upstream end of the combustion chamber 12, and the exit valve 26 is shown disposed at the downstream end of the combustion chamber 12. The PDE 10 further includes a not-shown ignition system, such as a spark igniter or torch igniter, for igniting the fuel and oxidizer mixture in the combustion chamber 12. The combustion chamber 12 includes inner and outer walls 30, 32, and a plenum wall 34 that surrounds the outer wall 32 to form an annular plenum 44. As will be described in greater detail below, flow passages 40 and aerodynamic check valves 50 are provided between the inner and outer walls 30, 32 to draw cooling air from the plenum 44 to cool the combustion chamber 12 and to prevent or substantially inhibit backflow of hot gases into the plenum 44.

The PDE 10 can be configured to operate and/or function in any suitable manner to transfer energy by pressure waves. To illustrate the effects of the combustion chamber 12, the PDE 10 is described herein as operating based on the principle of constant volume combustion, which creates a pressure rise in the combustion chamber 12 during the combustion process. In a first part of the combustion cycle, during a low pressure portion of the cycle, the fuel supply 20 and oxidizer supply 22 supply the fuel and oxidizer mixture into the combustion chamber 12, and the cooling air supply 24 supplies cooling air to the flow passages 40 between the walls 30, 32 of the combustion chamber 12. The cooling air can serve to internally cool the walls 30, 32, provide a protective cool film of air on the interior of the inner wall 30 to keep residual, hot combusted gases from significantly heating the combustion chamber 12 walls, and to provide a fuel-free, clean protective layer of air between the wall and the fuel and oxidizer mixture brought in during the fill cycle. This third effect of cooling flow prevents or substantially reduces levels of near wall burning from occurring on the inside of the combustion chamber 12 walls and can reduce heat flux into the combustion chamber 12 walls. In the next part of the combustion cycle, the exit valve 26 is closed, which can cause a relatively small pressure rise in the combustion chamber 12. In one form, the pressure rise can be high enough to prevent additional cooling air from entering into the combustion chamber 12. In another form, the pressure rise can be high enough to cause back flow from the combustion chamber 12 internal flow path to the cooling plenum 44. In a third part of the combustion cycle, the fuel and oxidizer mixture is ignited by the ignition system to produce deflagration and/or detonation. The deflagration and/or detonation generates a heat load on the walls 30, 32 of the combustion chamber 12 and a relatively high increase in pressure. The high heat load on the combustor chamber 12 walls is mitigated in the regions where the cooling film has been injected because the fuel-free film can prevent or substantially reduce the near wall combustion from heating the walls 30, 32. The pressure spike during this third combustion step can cause the internal tube pressure to rise by as much as five times the pressure in the plenum 44. In a fourth part of the combustion cycle, the exit valve 26 is opened to allow the combustion gases to exhaust from the combustion chamber 12, generating energy in the form of a pressure wave. The hot combustion gases increase in velocity and scrub the walls 30, 32 of the combustion chamber 12, which can cause an increase in the heat of the walls 30, 32. Further, the pressure in the combustion chamber 12 decreases so that backflow from the combustion chamber 12 subsides or reverses and cooling air begins to flow into the flow passages 40 to cool the combustion chamber 12.

Referring now to FIGS. 2 and 3 in greater detail, the combustion chamber 12 has an annular shape dual wall design in axial cross section, where the arrow marked by the character L in FIG. 2 indicates the axis of the combustion chamber 12. The combustion chamber 12 can have other axial cross-sectional shapes, as will be appreciated. As shown in FIGS. 2 and 3, the dual wall design comprises the inner wall 30, also referred to herein as a hot side wall 30, and the outer wall 32, also referred to herein as a cold side wall 32. The inner wall 30 has a plurality of hot side holes 60 projecting radially through the thickness of the inner wall 30, and the outer wall 32 has a plurality of cold side holes 62 projecting radially through the thickness of the outer wall 32. The annular plenum 44 between the outer wall 32 and the plenum wall 34 is in fluid communication with the cold side holes 62. In operation, combustion gas in the form of a fuel and oxidizer mixture enters the combustion chamber 12 via the fuel supply 20 and the oxidizer supply 22, and is combusted on the inside of the hot side wall 30 of the combustion chamber 12, which is the upper portion of FIG. 3. Cooling air from the cooling air supply 24 is routed from the plenum 44 to the combustion chamber 12 via the cold side holes 62 (where the cooling air enters), the flow passage 40, and the hot side holes 60 (where the cooling air exits). In an additional and/or alternative form, the cooling air supply 24 can supply cooling air to the cold side holes 62 via one or more supply lines and/or valves in fluid communication with the cold side holes 62.

As shown in FIG. 3, the cold side holes 62 are in fluid communication with the hot side holes 60 by way of the flow passages 40 that are disposed between the inner and outer walls 30, 32. In the FIG. 3 embodiment, cooling air, which is indicated by arrows A, can flow in an upstream direction, while combustion gas, which is indicated by arrows C, can flow in a downstream direction, that is counter to the combustion gas flow, to cool the inner wall 30 of the combustion chamber 12. As will be appreciated, the present application is not limited to the counter flow arrangement and/or hole characteristics shown in FIG. 3 and other embodiments are contemplated. For example, in an embodiment, the cooling air and combustion gas can flow in a parallel arrangement. Further, although the hot side and cold side holes 60, 62 are shown in FIG. 3 to project through the thicknesses of the respective walls 30, 32 in a linear manner, the holes 60, 62 need not be limited to such configuration. In one form, the holes 60, 62 can project through the thicknesses of the walls 30, 32 at an angle, or in a curved or other nonlinear manner. In another form, the holes 60, 62 can be tapered radially inwardly or tapered radially outwardly. The holes 60, 62 are illustrated as circular in shape in radial direction view, although it will be appreciated that the holes 60, 62 can have any suitable shape for passage of fluid therethrough. Further, the holes 60, 62 need not be the same size, as illustrated, and can vary in size between hot side holes 60 and cold side holes 62, or amongst the hot side holes 60 and/or amongst the cold side holes 62.

A plurality of flow passages 40 and a plurality of aerodynamic check valves 50 are provided radially between the inner wall 30 and the outer wall 32. The aerodynamic check valves 50 are formed by forward flow separator portions 90 and backflow inhibiting portions 100, to be described in greater detail below. The flow passages 40 are situated between axially adjacent S-shape (serpentine shape) walls 70, where the S-shape walls 70 extend about the axis L of the combustion chamber 12 over either a portion or all of the circumference of the combustion chamber 12. In the illustrative embodiment, the S-shape walls 70 have the same configuration and are circumferentially distributed about the axis L in the same manner. Thus, in the illustrative embodiment the cooling pattern provided by the flow passages 40 and the aerodynamic check valves 50 repeats itself in the axial direction as well as the circumferential (spanwise) direction.

Each flow passage 40 has an upstream end and a downstream end, defined in the illustrative embodiment based on the forward flow direction of the cooling air through the flow passages 40, as indicated by the arrows A in FIG. 3. Each S-shape wall 70 is made up of multiple alternating upstream facing and downstream facing portions 76, 78, or left and right bend portions 76, 78, about the axis L. Within the inner perimeter of each left bend portion 76 is located a hot side hole 60 of the inner wall 30, and within the inner perimeter of each right bend portion 78 is located a cold side hole 62 of the outer wall 32. Each cold side hole 62 opens into the inside of a right bend portion 78, and each hot side hole 60 receives cooling air from the inside of a left bend portion 76. Each flow passage 40 is in fluid communication at its upstream end with a cold side hole 62 of one S-shape wall 70, and at its downstream end with a hot side hole 60 of an axially adjacent downstream S-shape wall 70. The flow passage 40 includes bend passages 80 that are disposed between the downstream end of the left bend portion 76 and the upstream ends of circumferentially adjacent right bend portions 78.

Each of the right bend portions 78 of the S-shape walls 70 forms a forward flow separator portion 90. The forward flow separator portion 90 has a convex shape to enable smooth flow of cooling air around the forward flow separator portion 90. In the illustrative embodiment, the forward flow separator portion 90 has a semicircular shape although the forward flow separator portion 90 can take on other configurations or shapes as would occur to those skilled in the art. The forward flow separator portion 90 of one S-shape wall 70 projects in an upstream direction toward the cold side hole 62 located within the right bend portion 78 of the axially adjacent upstream S-shape wall 70. As such, the forward flow separator portion 90 lies in the path of cooling air flowing downstream from the cold side hole 62. Further, on the opposite side of the bend passage 80 from the upstream end of the right bend portion 78 are located two downstream ends of respective left bend portions 76 of the axially adjacent S-shape wall 70, each of which can include a slightly curved flow controlling edge 92. The two flow controlling edges 92 together form an outwardly tapered section in the flow passage 40 where the flow passage 40 approaches the forward flow separator portion 90. Owing to the curved shape of the forward flow separator portion 90, the forward flow separator portion 90 serves to smoothly separate the flow of cooling air into two substantially evenly divided flows through the respective bend passages 80. Further, the outwardly tapered section formed by the flow controlling edges 92 can aid the smooth flow of cooling air through the bend passages 80.

Figure 4:
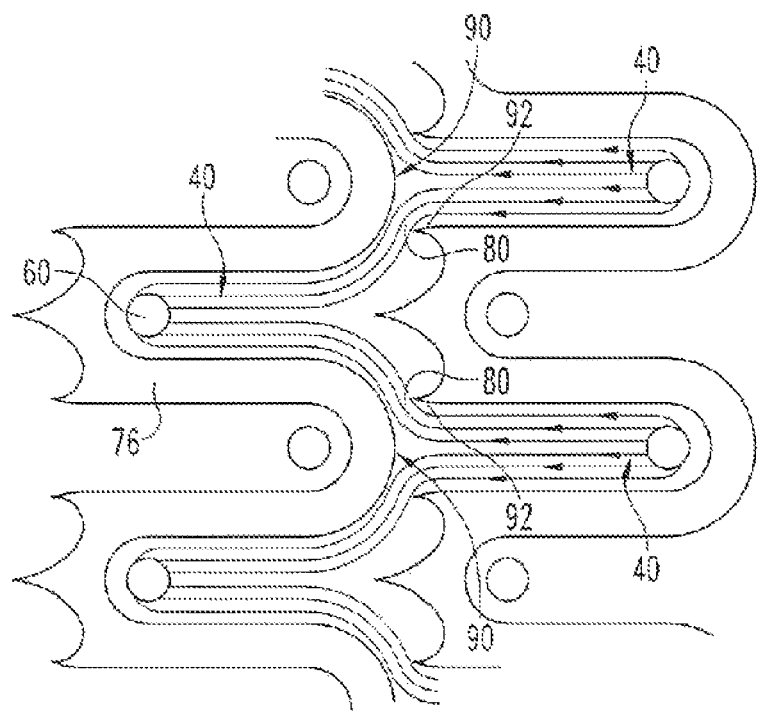
FIG. 4 is an enlarged view of an aerodynamic check valve of the combustion chamber according to an embodiment, showing forward flow of cooling air.

FIG. 4 shows the streamlines of cooling air as the cooling air passes through a flow passage 40 and around the forward flow separator portion 90 along the way. As cooling air flows in the forward direction (from right to left in FIG. 4), the cooling air separates and smoothly bends around the forward flow separator portion 90 and along the outwardly tapered section, passing through the bend passages 80 of the flow passage 40, before continuing downstream to two hot side holes 60 located within respective circumferentially adjacent left bend portions 76.

Each of the left bend portions 76 of the S-shape walls 70 forms a backflow inhibiting portion 100. The backflow inhibiting portion 100 has a concave shape to deflect backflow gases back toward the backflow gases, in effect serving to prevent or substantially inhibit the flow of the backflow gases through the flow passage 40. In the illustrative embodiment, the backflow inhibiting portion 100 includes a sharp forwardly directed central conically pointed portion 102 flanked by a pair of deflector portions defined by hook-shape walls 104 that terminate into respective radially inwardly directed sharp edges 106. The backflow inhibiting portion 100 can take on other configurations or shapes as would occur to those skilled in the art. The backflow inhibiting portion 100 of one S-shape wall 70 projects in a downstream direction toward the hot side hole 60 located within the left bend portion 76 of the axially adjacent upstream S-shape wall 70. As such, the backflow inhibiting portion 100 lies in the path of backflow gases, that is gases flowing upstream in the reverse direction, from the hot side hole 60. Owing to the deflection configuration of the backflow inhibiting portion 100, the backflow inhibiting portion 100 serves to prevent or substantially inhibit the flow of backflow gases from the combustion chamber 12 or within the flow passage 40 upstream to the cold side holes 62.

Figure 5:
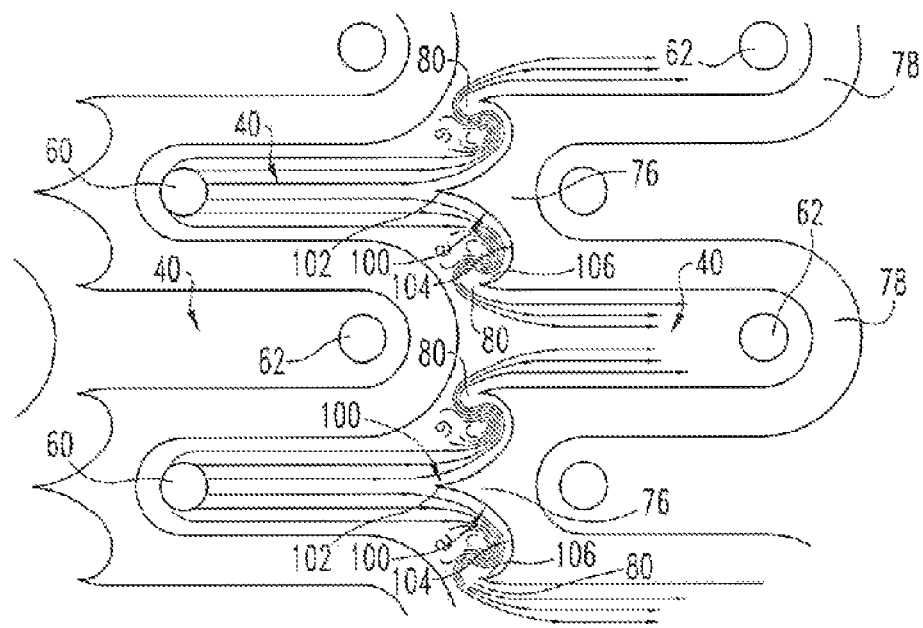
FIG. 5 is an enlarged view of an aerodynamic check valve of the combustion chamber according to an embodiment, showing backflow of hot gases.

FIG. 5 shows the streamlines of backflow gases as the backflow gases pass through a flow passage 40 and around the backflow inhibiting portion 100 along the way. As backflow gases flow in the reverse direction (from left to right in FIG. 5), the backflow gases pass along the pointed conical portion 102 and enter the interior of the deflector portions defined by the hook-shape walls 104. In passing through the interior of the deflector portions, the backflow gases are deflected through an angle of approximately 195 degrees so that as the gases reach the radially inwardly directed sharp edges 106, the gases move radially inwardly toward the backflow gases, that is back toward themselves. This requires that the backflow gases be subjected to a further deflection through an additional angle of about 180 degrees before the backflow gases can emerge from the bend passages 80 and continue their reverse direction toward the two cold side holes 62 located within respective circumferentially adjacent right bend portions 78.

The flow passages 40 and aerodynamic check valves 50 provided between the inner and outer walls 30, 32 can thus serve to channel cooling air from the plenum 44 to the combustion chamber 12 and to prevent or substantially inhibit reverse flow of backflow gases into the plenum 44. As gases flow through the flow passage 40, the course of pressure will remain practically unchanged in the forward direction (from right to left in FIG. 4), while the resistance in the reverse direction (from left to right in FIG. 5) is immensely increased.

Referring again to the PDE 10 shown in FIGS. 1 and 3, the combustion chamber 12 described herein, including the aerodynamic check valves 50 disposed between the inner and outer walls 30, 32, can eliminate or substantially reduce the effects of hot gases flowing out through the cold side holes 62 and into the plenum 44. In one form, the check valves 50 can eliminate or substantially reduce excessive combustion chamber wall heating and plenum heating that would otherwise be caused by the backflowing hot gases in the absence of the check valves 50. Owing to the substantially reduced flow rate of the backflowing hot gases, the check valves 50 serve to effectively cool the combustion chamber walls 30, 32, and to realize a reduced net heating of the combustion chamber walls 30, 32. In one form, the aerodynamic check valves 50 can reduce the backflow rate by about 1/50th to about 1/100th of the flow rate that would otherwise exist in a dual wall cooling system without the aerodynamic check valves 50. The net effect of the cooling system of the combustion chamber 12 can reduce the time averaged combustion chamber wall temperature such that the operation and function of the combustion chamber 12 are properly maintained and the temperatures of the walls 30, 32 are maintained at a desired level.

The combustion chamber 12 of the illustrative PDE 10 provides an active air cooling scheme that provides effusion cooling and prevents or substantially inhibits backflow from the hot primary stream to the cold cooling stream during the high pressure pulse portion of the combustion cycle. In one embodiment, the backflow prevention can be achieved by using the dual wall 30, 32 cooling system and integrated flow passage 40, where the geometric configuration of the flow passage 40 serves as an aerodynamic check valve 50. Such a dual wall system can provide enhanced internal heat transfer, cooling the combustion chamber wall more efficiently than for example an effusion only cooling system. The aerodynamic check valve 50 can be integrated into the internal flow passage 40, and the flow passage 40 can be configured between the hot side wall 30 with effusion cooling holes 60, and the cold side wall 32 with cold side holes 62 to allow for the entrance and metering of cooling air. The cooling air can enter the cold side holes 62 from the plenum 44 surrounding the combustion chamber walls 30, 32. In one form, the plenum 44 contains clean air (no fuel) and has a constant pressure which is higher than the combustion chamber 12 internal pressure during some parts of the combustion cycle, but is lower than the combustion chamber 12 internal pressure during other parts of the combustion cycle.

Figure 6:
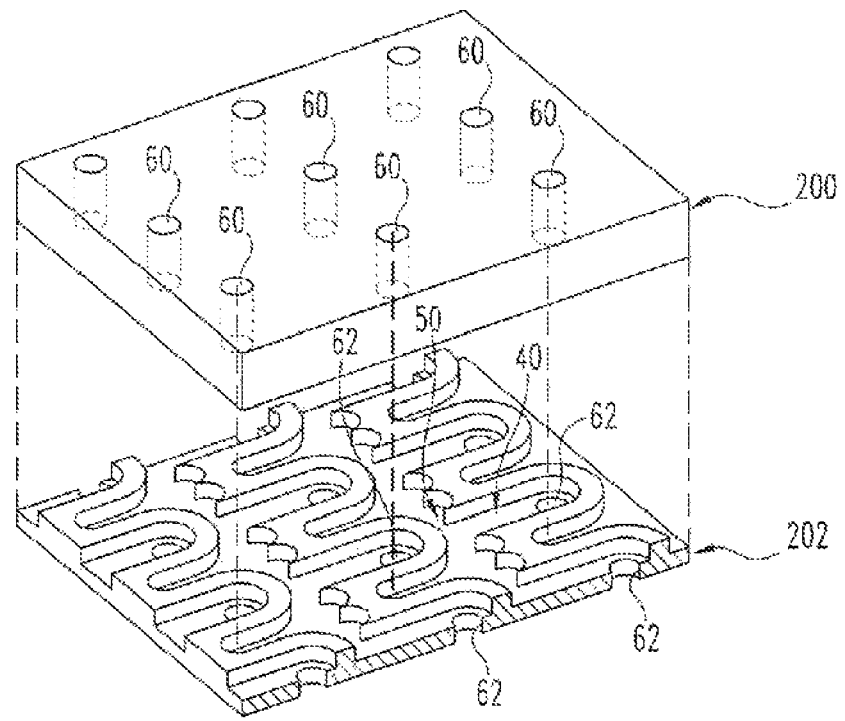
FIG. 6 is an exploded view of the inner and outer walls and aerodynamic check valves of a combustor tube according to an embodiment.
Figure 7:
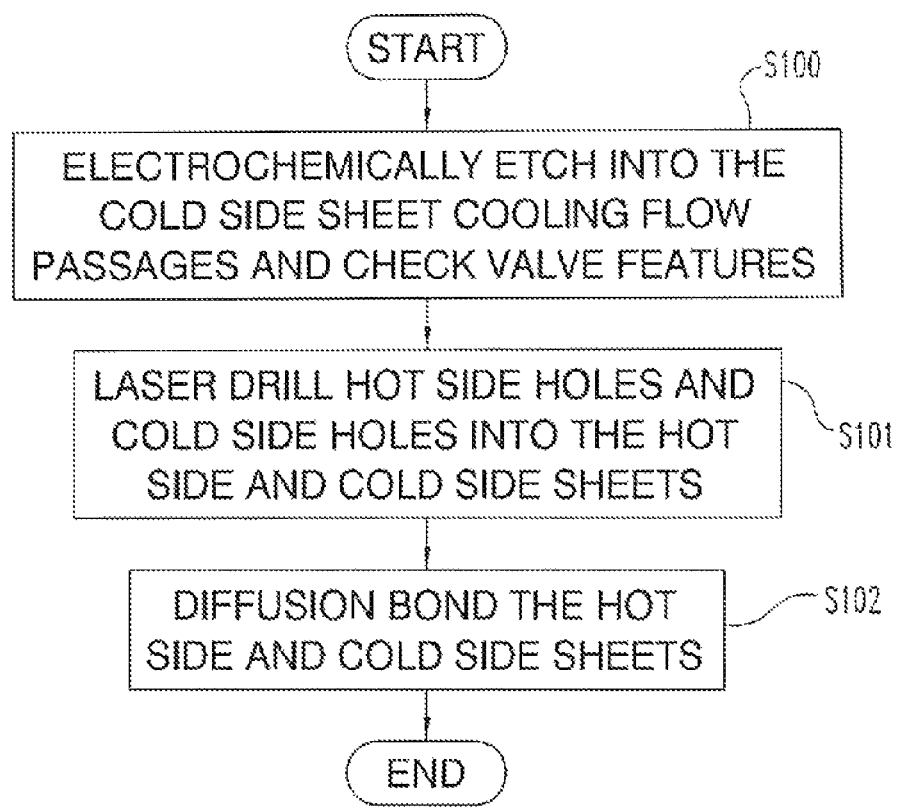
FIG. 7 is a flowchart showing a method of manufacturing a combustor tube according to an embodiment.

Referring now to FIGS. 6 and 7, a method of manufacturing combustor liners or combustor tubes having integrated cooling and check valve features according to an embodiment will now be described. The manufacturing process can be performed according to any suitable method including for example Lamilloy sheet manufacturing methods, or casting and direct metal laser sintering (DMLS). Initially, hot and cold side sheets 200, 202 are provided. Next, cooling flow passages 40, including the check valve 50 features of a forward flow separator portion 90 and a backflow inhibiting portion 100, are electrochemically etched into the cold side sheet 202 (S100). Next, the hot side holes 60 and cold side holds 62 are laser drilled into the respective hot side and cold side sheets 200, 202 (S101). Next, the hot side sheet 200 and cold side sheet 202 are diffusion bonded (S102). The cooling pattern provided by the flow passages 40 and the aerodynamic valves 50 can be repeated as often as is necessary or desired to make a combustor liner or combustor tube to a desired length and width, length and diameter, or length and circumferential span.

While the invention has been described in connection with what is presently considered to be the most practical and preferred embodiment, it is to be understood that the disclosure is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A combustion chamber comprising
an inner wall; and
an outer wall surrounding the inner wall;
the inner wall having a plurality of effusion holes in fluid communication with an inside of the combustion chamber, the outer wall having a plurality of cooling side holes in fluid communication with a cooling source;
the inner wall and the outer wall defining a flow passage therebetween that fluidly connects one or more of the cooling side holes with one or more of the effusion holes,
the flow passage having a geometric configuration to permit forward flow of gases through the flow passage from the cooling source to the inside of the combustion chamber and to restrict reverse flow of gases through the flow passage from the inside of the combustion chamber to the cooling source, and
the permitted flow rate being greater than the restricted flow rate,
wherein the geometric configuration includes a backflow inhibiting portion formed by a forwardly directed pointed conical portion flanked by a pair of deflector portions and each deflector portion is defined by a forwardly opening curved wall.

2. The combustion chamber of claim 1, wherein the geometric configuration deflects the reverse flow of gases back toward the reverse flow of gases.

3. The combustion chamber of claim 1, wherein the geometric configuration further comprises a flow separator portion having a convex shape about which at least a portion the forward flow of gases bends as the forward flow of gases flow from the cooling side holes to the effusion holes.

4. The combustion chamber of claim 1, wherein the inner wall is configured to contain a combustion process having a detonation cycle.

5. The combustion chamber of claim 1, further comprising a plenum wall, wherein the outer wall and plenum wall define therebetween a plenum in fluid communication with the cold side hole.

6. The combustion chamber of claim 1, further comprising axially adjacent S-shape walls disposed between the inner and outer walls and extending about a longitudinal axis of the combustion chamber, wherein the flow passage is disposed between the S-shape walls.

7. The combustion chamber of claim 6, wherein the combustion chamber has substantially a tube shape and the S-shape walls extend about the longitudinal axis over at least a portion of the circumference of the combustion chamber.

8. A combustion chamber comprising
an inner wall and an outer wall surrounding the inner wall, the inner wall including a plurality of combustion side holes projecting therethrough, the outer wall including a plurality of cooling side holes projecting therethrough;
an internal flow channel disposed between the inner wall and the outer wall and fluidly connecting one or more of the cooling side holes with one or more of the combustion side holes; and
an aerodynamic check valve disposed between the inner wall and the outer wall and configured to allow flow of gases through the internal flow channel in a forward direction from the one or more cooling side holes to the one or more combustion side holes, and to substantially inhibit flow of gases through the internal flow channel in a reverse direction from the one or more combustion side holes to the one or more cooling side holes,
wherein the check valve includes a backflow inhibitor formed by a forwardly directed pointed conical portion located between a pair of deflector portions defined by curved walls and the curved walls terminate into respective pointed edges that are directed toward the pointed conical portion.

9. The combustion chamber of claim 8, wherein the combustion chamber has substantially a tube shape and comprises a circumferential span of multiple alternating upstream facing walls and downstream facing walls.

10. The combustion chamber of claim 9, wherein a cooling side hole is located within an inner perimeter of the upstream facing wall, and a combustion side hole is located within an inner perimeter of the downstream facing wall.

11. The combustion chamber of claim 9, wherein the internal flow channel has intermediate passages that are disposed between a downstream end of the upstream facing wall and upstream ends of circumferentially adjacent downstream facing walls.

12. The combustion chamber of claim 9, wherein the downstream facing wall forms a forward flow separator having a curved shape that separates the gases flowing through the internal flow channel in the forward direction.

13. The combustion chamber of claim 12, wherein the forward flow separator has a semicircular shape.

14. The combustion chamber of claim 12, wherein the internal flow channel has intermediate passages that are disposed between the downstream end of the upstream facing wall and the upstream ends of circumferentially adjacent downstream facing walls, and the forward flow separator separates the flow of gases in the forward direction into two flows to the respective intermediate passages.

15. The combustion chamber of claim 9, wherein the upstream facing wall forms the backflow inhibitor.

16. The combustion chamber of claim 15, wherein the backflow inhibitor is configured to deflect the flow of gases in the reverse direction back toward the flow of gases.

17. The combustion chamber of claim 15, wherein the backflow inhibitor is configured to deflect the flow of gases in the reverse direction through an angle of about 195 degrees.

18. A combustion chamber comprising an inner wall and an outer wall surrounding the inner wall, the inner wall including a plurality of combustion side holes projecting therethrough, the outer wall including a plurality of cooling side holes projecting therethrough;

an internal flow channel disposed between the inner wall and the outer wall and fluidly connecting one or more of the cooling side holes with one or more of the combustion side holes; and an aerodynamic check valve disposed between the inner wall and the outer wall and configured to allow flow of gases through the internal flow channel in a forward direction from the one or more cooling side holes to the one or more combustion side holes, and to substantially inhibit flow of gases through the internal flow channel in a reverse direction from the one or more combustion side holes to the one or more cooling side holes, wherein the combustion chamber has substantially a tube shape and comprises a circumferential span of multiple alternating upstream facing walls and downstream facing walls, wherein the upstream facing wall forms a backflow inhibitor, wherein the backflow inhibitor includes a forwardly directed central conically pointed portion flanked by a pair of deflector portions defined by concave shaped walls.

* * * * *